Aug. 11, 1925. 1,549,637
R. D. WADLEIGH
HAND REST FOR STEERING WHEELS
Filed Nov. 6, 1924
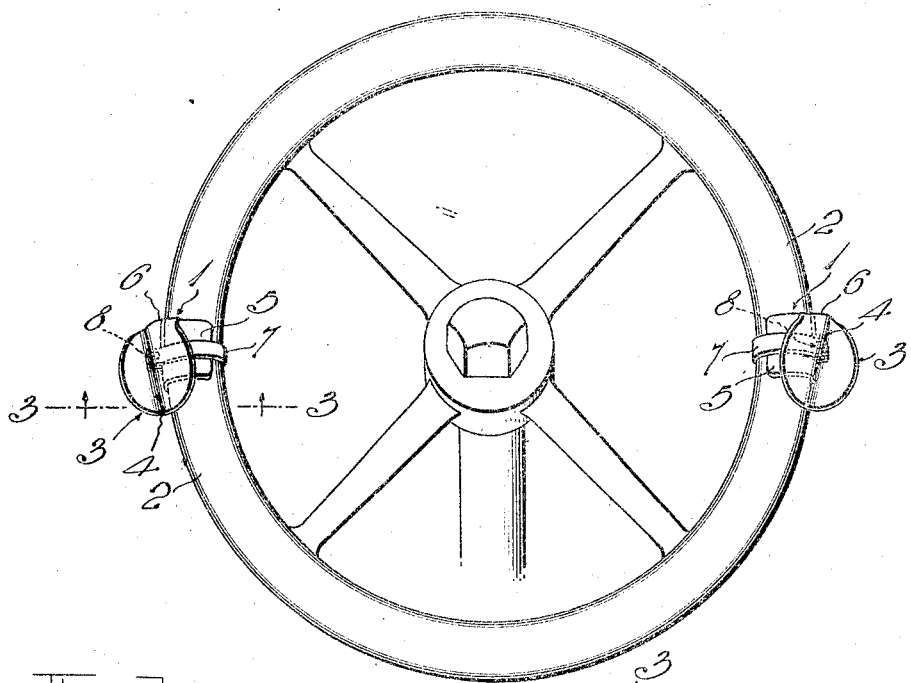
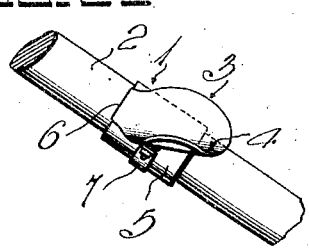
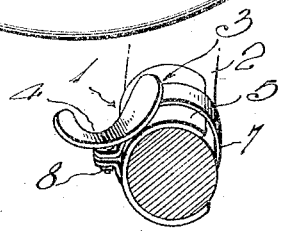
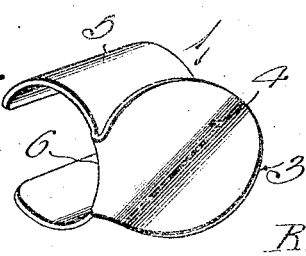
Witness
H. Woodard
Inventor
R. D. Wadleigh
By H. B. Wilson & Co.
Attorneys Patented Aug. 11, 1925.

1,549,637

UNITED STATES PATENT OFFICE.

RUFUS D. WADLEIGH, OF BANGOR, MAINE.

HAND REST FOR STEERING WHEELS.

Application filed November 6, 1924. Serial No. 748,143.

*To all whom it may concern:*

Be it known that I, RUFUS D. WADLEIGH, a citizen of the United States, residing at Bangor, in the county of Penobscot and State of Maine, have invented certain new and useful Improvements in Hand Rests for Steering Wheels; and I do declare the following to be a full, clear, and exact description of the invention, such as will enable others skilled in the art to which it appertains to make and use the same.

My invention relates to improvements in steering wheels for automobiles, and it is one object of the invention to provide a steering wheel rim having a unique form of laterally projecting ledge upon which the driver may rest the outer edge of his hand, so that the latter may be easily supported without any effort on the part of the driver. One or two of the rests may be employed, but two are preferably used in most instances.

A further object of the invention is to provide a novel attachment for a steering wheel rim, embodying the rest, so that such attachment may be easily applied to an ordinary steering wheel.

With the foregoing and minor objects in view, the invention resides in the novel subject matter hereinafter described and claimed, the description being supplemented by the accompanying drawing.

Figure 1 is a plan view of a steering wheel equipped with two of the hand rests.

Figure 2 is a side elevation of one of the rests and a portion of the steering wheel.

Figure 3 is a vertical sectional view of the steering wheel rim as indicated by line 3—3 of Fig. 1, showing a rear elevation of one of the rests.

Figure 4 is a perspective view of the rest depicted in Figs. 2 and 3.

In the form of construction selected for illustration in the present application, I have shown two attachments 1 to be mounted on the rim 2 of an ordinary steering wheel, said attachments being duplicates with the exception that they are constructed for use at the left and right-hand sides of the steering wheel, respectively. The left-hand attachment is detailed in the drawing. This attachment comprises a preferably circular plate 3 which may be bent or otherwise formed to provide its upper side with an upwardly and laterally opening channel 4. This plate is adapted to project laterally to some extent from the rim 2 and to partially overlie this rim, and any suitable attaching means for the plate, may be provided. In the present showing, a collar 5 is provided to embrace the wheel rim, said collar carrying the plate 3. If desired, the front end of this plate may be integrally joined to the front edge of the collar 5, as shown at 6. The collar 5 may be suitably secured upon the steering wheel rim, and for this puropse, I have shown a split clamping collar 7 to surround the rim and the collar 5, the ends of said collar 7 being connected by a bolt 8 which may underlie the plate 3.

As indicated by the shading in Figs. 1, 2 and 3, the bottom of the channel 4 is substantially horizontal and is also somewhat oblique to the axis of the collar 5, the latter having an inclined position when attached to the steering wheel rim, as evident in Fig. 2.

By providing the novel construction herein disclosed, or a substantial equivalent thereof in which the novel hand rest or ledge is suitably mounted on the steering wheel rim, a very desirable asset to easy driving is produced, as the driver's hands and arms will be supported without any effort on his part, this being particularly advantageous when driving long distances, without relief at the wheel.

I claim:

1. A hand rest for a steering wheel comprising a plate having a channeled upper side on which to rest the outer edge of the hand, and a collar carrying said plate and adapted to embrace the steering wheel rim.

2. A structure as specified in claim 1; the axis of said collar being inclined with respect to the bottom of the channel to dispose the latter in a substantially horizontal position for use.

3. A structure as specified in claim 1; the channel bottom being oblique to the axis of the collar when viewed from above.

4. A structure as specified in claim 1; the channel bottom being oblique to the axis of the collar when viewed from above, said collar axis being inclined with respect to said channel bottom to dispose the latter in a substantially horizontal position for use.

In testimony whereof I have hereunto affixed my signature.

RUFUS D. WADLEIGH.